Figure 1:
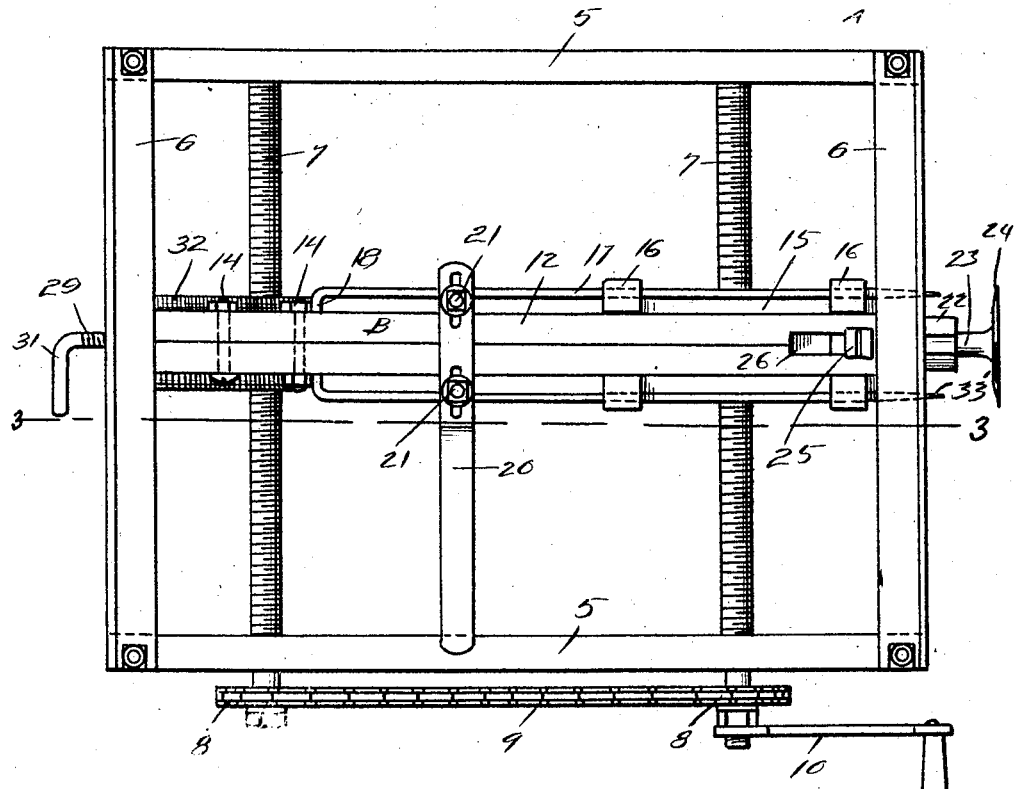

Nov. 23, 1926.

A. E. PALIN ET AL 1,608,334

MACHINE FOR REFACING AND SMOOTHING SOLID TRUCK TIRES

Filed June 18, 1925  2 Sheets-Sheet 1

Nov. 23, 1926.
A. E. PALIN ET AL
1,608,334
MACHINE FOR REFACING AND SMOOTHING SOLID TRUCK TIRES
Filed June 18, 1925    2 Sheets-Sheet 2
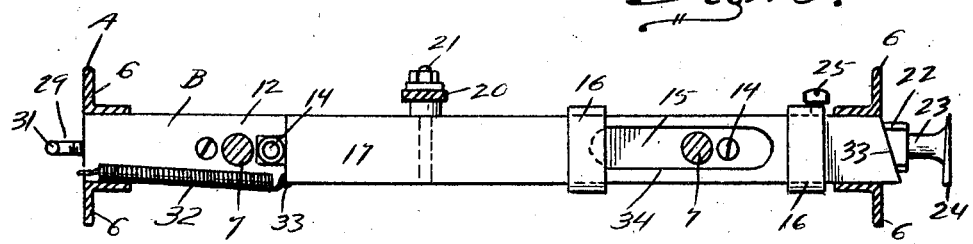
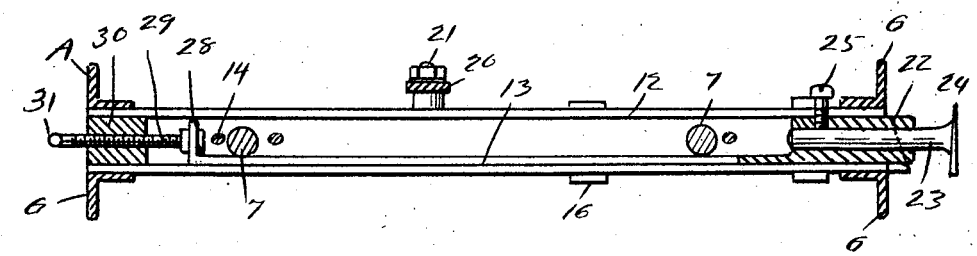
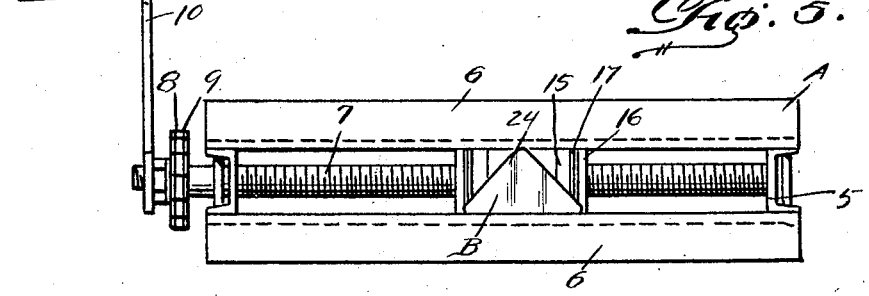
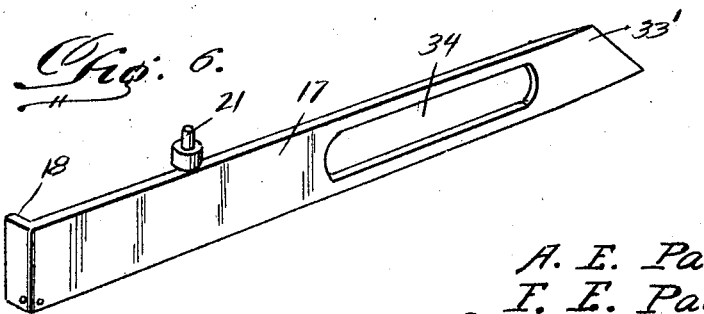
Inventors
A. E. Palin,
I. E. Palin,
By Clarence A. O'Brien
Attorney Patented Nov. 23, 1926.

1,608,334

UNITED STATES PATENT OFFICE.

ALFRED E. PALIN AND FRANK E. PALIN, OF SANTA ROSA, CALIFORNIA.

MACHINE FOR REFACING AND SMOOTHING SOLID TRUCK TIRES.

Application filed June 18, 1925. Serial No. 38,120.

This invention relates to a solid truck tire trimming apparatus, and has for its principal object to provide a machine which will reface and smooth the solid truck tires while they are still on the truck.

Another important object of the invention is to provide a solid tire trimming apparatus of this nature which embodies a frame having a carriage movable therein with means associated therewith for actuating it transversely of the frame, said carriage adjustably supporting trimming means.

Another important object of the invention is to provide a trimming apparatus of this nature having a main trimming knife, which is adjustably mounted and movable across the tread of the tire, and side trimmers for cutting away the loose rubber which has been trimmed by the main cutter from the tire tread.

A still further object of the invention is to provide a machine for refacing and smoothing solid truck tires while the tires are on the truck wheels, which is exceedingly simple in its construction, easy to manipulate, thoroughly reliable and efficient in its operation, nor likely to easily become out of order, inexpensive to operate and manufacture, strong, durable, and otherwise well adapted to the purpose for which it is designed.

With the above and numerous other objects in view as will appear as the description proceeds the invention resides in certain novel features of construction, and in the combination and arrangement of parts as will be hereinafter more fully described and claimed.

In the drawing:—

Figure 2:
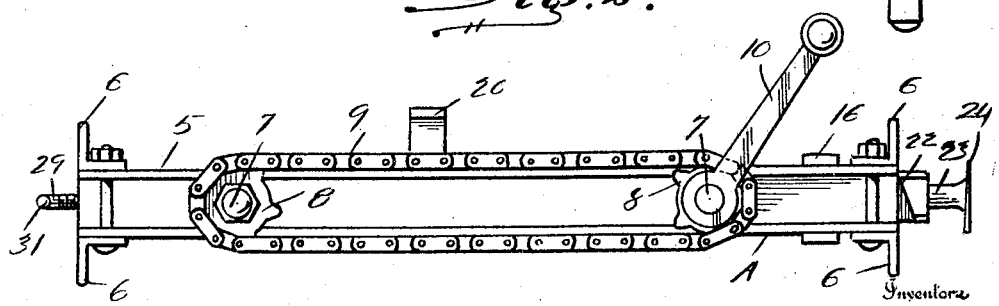

Figure 1 is a top plan view of the apparatus embodying the features of our invention, Figure 2 is a side elevation thereof, Figure 3 is a longitudial section taken therethrough substantially on the line 3—3 of Figure 1, Figure 4 is a longitudinal section through the frame and the carriage of the apparatus, Figure 5 is an end elevation of the apparatus, and Figure 6 is a detail perspective view of one of the side trimming knives.

Referring to the drawing in detail, it will be seen that A designates generally a frame which is adapted to be supported above the ground on a suitable stand (not shown) so as to extend in a horizontal plane in approximate alignment with the axis of a truck wheel when jacked up. This stand may be of any suitable construction and does not form a part of our invention. A carriage designated generally by the letter B is mounted in the frame to travel transversely thereof. This carriage extends longitudinally of the frame as is clearly seen in Figure 1.

Referring now particularly to the frame A it will be seen that numerals 5 designate the two longitudinally extending side bars, which are preferably constructed of U-shaped angle irons, and have their ends connected by the end bars 6. At each end of the frame there are located two end bars 6, one on the upper edges of the bars 5, and one on the lower edges thereof. The spaces between these end bars 6 form ways in which are slidable the ends of the carriage B. A pair of threaded shafts 7 are journaled transversely across the frame in the side bars 5 in parallel spaced relation to each other, one shaft being located adjacent each pair of end bars 6. The shafts 7 extend through one of the side bars 5 and have on the extended ends sprockets 8 over which is trained a chain 9. A crank 10 is provided on one shaft 7 adjacent its sprocket 8 so that the shafts rotate in unison with each other.

Referring now particularly to the construction of the carriage B it will be seen that numerals 12 represent two beams which are preferably constructed of U-shaped channel irons having their longitudinal edges disposed in abutment with each other, thereby forming a way for receiving holder 13. These beams 12 are held together by bolts 14 or in any other suitable manner. The ends of the beams 12 are slidable between the end bars 6 as is clearly indicated in Figures 3 and 4. The threaded shafts 7 extend transversely through the beams 12, and are threadingly engaged therewith so that by turning the crank 10, the beams may be moved transversely of the frame. A pair of blocks 15 are located one on each side of the carriage B, being fixed to the forward ends of the beams 12 by means of one of the bolts 14, as is clearly indicated in Figure 3. A loop strap 16 is formed at each end of each block 15. Side trimmer or cutter shanks 17 are slidable over the blocks 15 through the loops 16 and have lateral extensions 18 at one end for riding on the sides of the beams 12, as is clearly indicated in Figure 1, and for engaging the ends of the adjacent bolt 14 which functions as a stop. A lever 20 is mounted on the carriage, having pin and slot connections 21 with the shanks 17. By swinging the lever 20 in one direction it will be seen that the knife or shank 17 adjacent the handle end of the lever will be moved in one direction, and the knife at the other end thereof in the other direction and consequently since the projection 18 of one shank will engage the adjacent bolt 14 and will be stopped, only one shank 17 will be projected at a time.

The holder 13 is constructed at its forward end with a block 22 which slidably receives shank 23 of a triangular shaped blade 24. A set screw 25 extends through the block 22 and is adapted to bind on the shank 23 in order that it may be adjusted in relation to the block. This screw 25 extends upwardly through cut outs 26 provided in the upper portions of the beams 12 as is shown particularly in Figure 1. The blade 24 is in the form of an isosceles triangle and has its two upper edges sharpened as will be seen in Figure 1. The rear end of the holder is provided with an upstanding ear 28 which threadedly receives a threaded rod 29 threaded through a block 30 provided in the rear ends of the beams 12, and having its end offset as at 31 to form a crank. The swivel connection of this rod 29 with the offset extension 28 will allow the rod 29 when turned to move the holder 13 longitudinally between the beams 12. Springs 32 are attached to the ends of the shanks 17 as at 33 and to the rear ends of the beams 12, and tend to normally hold the side cutter shanks 17 in a retracted position, that is with their extensions 18 in abutment with the stop bolt 14. The forward ends of these shanks are beveled and sharpened as indicated at 33'. The shanks 17 are provided with elongated slots 34 through which project the threaded shafts 7.

Referring now particularly to the use of the apparatus, it will be seen that when it is supported in a horizontal plane above the ground at approximately the same level with the axis of a jacked up truck wheel, that the wheel is jacked up so that its entire periphery is in close proximity to the knife 24. The knife 24 is then adjusted in relation to the periphery of the tire depending upon the desired depth of the cut by means of the threaded rod 29. The carriage is located so that the cutter 24 is to one side of the tire so that as the wheel is run through the usual truck mechanism, the handle or crank 10 is turned so that the carriage moves toward the wheel, and thus the cutter 24 will be moved transversely across the periphery of the tire, shaving or trimming off a portion thereof. When the blade 24 has moved a distance in travelling transversely on the frame A, one of the side trimmers may be brought into play as previously indicated for trimming off the loose strip cut by the cutter 24. In using the apparatus it is preferable to work from one side to the center, and then from the other side to the center of the tire. A slit is cut in the side of the tire to the extent of about one inch at which time the knife 24 is stopped and the side knife is brought forward by means of the lever for eliminating this one inch strip of rubber which will fall to the ground, then another inch is cut with the knife 24 and so on across the tire. By using the side knives the knife 24 is always kept clear and there is no danger of its becoming clogged with rubber.

It is thought that the construction, operation, and advantages of the apparatus will now be clearly understood without a more detailed description thereof. It is desired, however, to point out that the present embodiment of the invention has been disclosed merely by way of example since in practice it attains the various features of advantage enumerable as desirable in the statement of the invention and the above description. It is apparent that numerous changes in the details of construction, and in the combination and arrangement of parts may be resorted to without departing from the spirit of the invention and the scope of the invention as hereinafter claimed or sacrificing any of its advantages.

Having thus described the invention, what we claim as new and desire to secure by Letters Patent is:—

1. An apparatus of the class described including a frame, a carriage located longitudinally in the frame, means for moving the carriage transversely of the frame, a holder slidable longitudinally in the carriage, means for adjusting the holder longitudinally of the carriage, a cutter carried by said holder, a pair of cutters located at the sides of the carriage, and means for alternately operating the side cutters.

2. An apparatus of the class described including a frame, a carriage mounted in the frame, means for adjusting the carriage transversely of the frame, a cutter carried by the carriage, means for adjusting the cutter longitudinally of the carriage, a pair of side cutters on the carriage, means for alternately adjusting the side cutters so that they may be extended one at a time beyond the end of the frame in association with the first mentioned cutter.

3. In an apparatus of the class described, a carriage, blocks on the carriage loops on the blocks, a pair of cutters one slidable over each block through the loop thereof and provided at one end with an offset engaging the carriage, a stop provided on the carriage for engagement by the offsets, a lever, and pin and slot connections between the lever and the cutters whereby the rocking of said lever will alternately extend the cutters.

In testimony whereof we affix our signatures.

ALFRED E. PALIN.
FRANK E. PALIN.